United States Patent
Saito et al.

(10) Patent No.: US 11,703,108 B2
(45) Date of Patent: Jul. 18, 2023

(54) TRANSMISSION MECHANISM

(71) Applicant: SANKYO SEISAKUSHO CO., Tokyo (JP)

(72) Inventors: Takeshi Saito, Kikugawa (JP); Naoyuki Takahashi, Kikugawa (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 0 days.

(21) Appl. No.: 17/799,203

(22) PCT Filed: Jan. 21, 2021

(86) PCT No.: PCT/JP2021/002008
§ 371 (c)(1),
(2) Date: Aug. 11, 2022

(87) PCT Pub. No.: WO2021/166540
PCT Pub. Date: Aug. 26, 2021

(65) Prior Publication Data
US 2023/0075517 A1 Mar. 9, 2023

(30) Foreign Application Priority Data
Feb. 19, 2020 (JP) .................. 2020-025839

(51) Int. Cl.
*F16H 25/06* (2006.01)
*F16H 1/32* (2006.01)

(52) U.S. Cl.
CPC ............... *F16H 1/32* (2013.01); *F16H 25/06* (2013.01); *F16H 2025/066* (2013.01)

(58) Field of Classification Search
CPC ...... F16H 1/32; F16H 25/06; F16H 2025/066; F16H 49/001; F16H 2049/003
See application file for complete search history.

(56) References Cited

U.S. PATENT DOCUMENTS 3,861,242 A * 1/1975 Adams ................. F16H 9/26
475/167
4,023,440 A * 5/1977 Kennington ............. F16H 1/32
475/167

(Continued)

FOREIGN PATENT DOCUMENTS

FR 2427519 A1 * 12/1979
JP S63-30657 U1 2/1988

(Continued)

OTHER PUBLICATIONS

International Search Report issued in PCT/JP2021/002008, dated Mar. 23, 2021; ISA/JP.

*Primary Examiner* — Sherry L Estremsky
(74) *Attorney, Agent, or Firm* — Harness, Dickey & Pierce, P.L.C.

(57) ABSTRACT

The present invention provides a transmission mechanism which is suited to miniaturization and can reduce motion transmission errors. This transmission mechanism includes: a cam; a plurality of pins arrayed along a side surface of the cam; guide plates provided with a plurality of guide holes; and a pair of gears disposed so as to sandwich the cam. Each pin contacts only one of the pair of gears, and is guided to the corresponding guide hole in conjunction with the rotation of the cam and moves along the cam and the corresponding gear, thereby causing the guide plates or the pair of gears to rotate with respect to the cam.

10 Claims, 23 Drawing Sheets

(56) References Cited

U.S. PATENT DOCUMENTS

| | | | | |
|---|---|---|---|---|
| 4,552,037 A | * | 11/1985 | Distin, Jr. | ............... F16H 1/32 475/159 |
| 8,998,763 B2 | * | 4/2015 | Wengenroth | ............ F16H 25/06 475/168 |

FOREIGN PATENT DOCUMENTS

| | | | | |
|---|---|---|---|---|
| JP | 2004-251374 A | | 9/2004 | |
| JP | 2009-281422 A | | 12/2009 | |
| WO | WO-2020067163 A1 | * | 4/2020 | ............. F16H 25/06 |

\* cited by examiner

TRANSMISSION MECHANISM

CROSS-REFERENCE TO RELATED APPLICATIONS

This application is a 371 U.S. National Phase of International Application No. PCT/JP2021/002008 filed on Jan. 21, 2021, which claims the benefit of priority from Japanese Patent Application No. 2020-025839 filed on Feb. 19, 2020. The entire disclosure of all of the above applications is incorporated herein by reference.

TECHNICAL FIELD

The present invention relates to a transmission mechanism suitable for miniaturization and capable of reducing a motion transmission error.

BACKGROUND ART

Patent Document 1 discloses a reduction mechanism including an elliptical cam, a roller link that contacts the outer periphery of the elliptical cam via rollers, a guide plate concentric with the elliptical cam, and a pair of internal tooth plates corresponding to both ends of each pin of the roller link. In the reduction mechanism, the elliptical cam is made an input shaft, the guide plate or the pair of internal tooth plates is/are made an output shaft, guide holes arranged in a circle are provided in the guide plate, each guide hole corresponds to each pin for the rollers of the roller link, internal teeth are formed in a circle in each of the pair of internal tooth plates, the number of the internal teeth is greater than the number of the pins of the roller link, and each pin of the roller link is guided via both each guide hole and the internal teeth in conjunction with rotation of the elliptical cam and advances into and retreats from the tooth groove of the internal tooth so as to rotate the guide plate or the pair of internal tooth plates relative to each other.

Patent Document 2 discloses a reduction device including a first cam on the surface of which an annular groove is formed, a plurality of stepped pins arranged in the annular groove and freely rolling in the annular groove, a second cam in which a plurality of circular holes each of which individually regulates a motion of each stepped pin are provided, and a third cam having teeth that mesh with the stepped pins and converting a rotational motion of the first cam into a rotational motion of a predetermined reduction ratio.

CITATION LIST

Patent Literature

PATENT DOCUMENT 1: JP-A-2004-251374
PATENT DOCUMENT 2: JP-A-2009-281422

SUMMARY OF INVENTION

Technical Problem

The reduction mechanism of Patent Document 1 has a structure in which the pins project on both sides of the input shaft side of the elliptical cam which receives the rotation of the input shaft and the output shaft side, come into contact with one of the pair of internal tooth plates on the input shaft side, and come into contact with the guide plate and the other of the pair of internal tooth plates on the output shaft side. In the reduction mechanism of Patent Document 1, there is a problem that if there is a shape error or a phase error during assembly between the pair of internal tooth plates existing on both sides of the input shaft side and the output shaft side, the pins which come into contact with the pair of internal tooth plates on both sides have been tilted, and this tilt causes a motion transmission error between the input shaft side and the output shaft side. The reduction device of Patent Document 2 has a structure in which the stepped pins are arranged so as to be surrounded by the annular groove. In the reduction device of Patent Document 2, there is a problem that the wear of the stepped pins is facilitated due to contact with the annular groove, and a long life cannot be expected.

Therefore, an object of the present invention is to provide a transmission mechanism capable of solving the above problems and suitable for miniaturization and capable of reducing a motion transmission error.

Solution to Problem

According to an aspect of the present invention, a transmission mechanism includes a first shaft rotatable about a first rotational axis, the first shaft including a cam concentric with the first shaft and fixed to the first shaft, the side surface of the cam having a positive curvature when viewed from the first rotational axis, a plurality of pins arranged along the side surface of the cam, a second shaft rotatable about a second rotational axis, a guide plate concentric with the second shaft, in the guide plate a plurality of guide holes being provided along a rotational direction of the second shaft, each pin being accommodated in a corresponding guide hole, and a pair of gears concentric with the second shaft, the pair of gears being arranged so as to sandwich the cam. Each pin comes into contact with only any one of the pair of gears. In conjunction with rotation of one of the first shaft and the second shaft, each pin is guided by the corresponding guide hole so as to move along the cam and a corresponding gear, thereby causing the other of the first shaft and the second shaft to rotate relative to the one of the first shaft and the second shaft.

According to a specific example of the present invention, in the transmission mechanism, each pin comes into contact with only any one of the pair of gears that is different from a gear of the pair of gears with which at least one of two adjacent pins comes into contact.

According to a specific example of the present invention, in the transmission mechanism, each pin is coupled with at least one of two adjacent pins by a chain.

According to a specific example of the present invention, in the transmission mechanism, the guide plate is a pair of guide plates arranged so as to sandwich the cam, and each pin is accommodated in a corresponding guide hole of any one of the pair of guide plates.

According to a specific example of the present invention, in the transmission mechanism, each pin is accommodated in a corresponding guide hole of any one of the pair of guide plates that is different from a guide plate of the pair of guide plates in which a corresponding guide hole in which at least one of two adjacent pins is accommodated is provided.

According to a specific example of the present invention, in the transmission mechanism, either the guide plate or the pair of gears is/are fixed to the second shaft.

According to a specific example of the present invention, in the transmission mechanism, each of the pair of gears is an internal gear, and the plurality of pins are arranged outside the cam.

According to a specific example of the present invention, in the transmission mechanism, when each gear is an internal gear, the curvature of the side surface of the cam obtained by circling along a rotational direction of the first shaft has two local maximal values or more, and the number of teeth of each of the pair of gears is the sum of the number of the plurality of pins and the number of the local maximal values.

According to a specific example of the present invention, in the transmission mechanism, each of the pair of gears is an external gear, and the plurality of pins are arranged inside the cam.

According to a specific example of the present invention, in the transmission mechanism, when each gear is an external gear, the curvature of the side surface of the cam obtained by circling along a rotational direction of the first shaft has two local maximal values or more, and the number of the plurality of pins is the sum of the number of teeth of each of the pair of gears and the number of the local maximal values.

Advantageous Effect of Invention

According to the present invention, each pin comes into contact with only any one of the pair of gears, whereby it is possible to reduce the motion transmission error between the input shaft side and the output shaft side due to the shape error and the assembly error.

Other objects, features and advantages of the present invention will become apparent from the following description of the embodiments of the present invention taken in conjunction with the accompanying drawings.

DESCRIPTION OF EMBODIMENTS

Figure 1A:
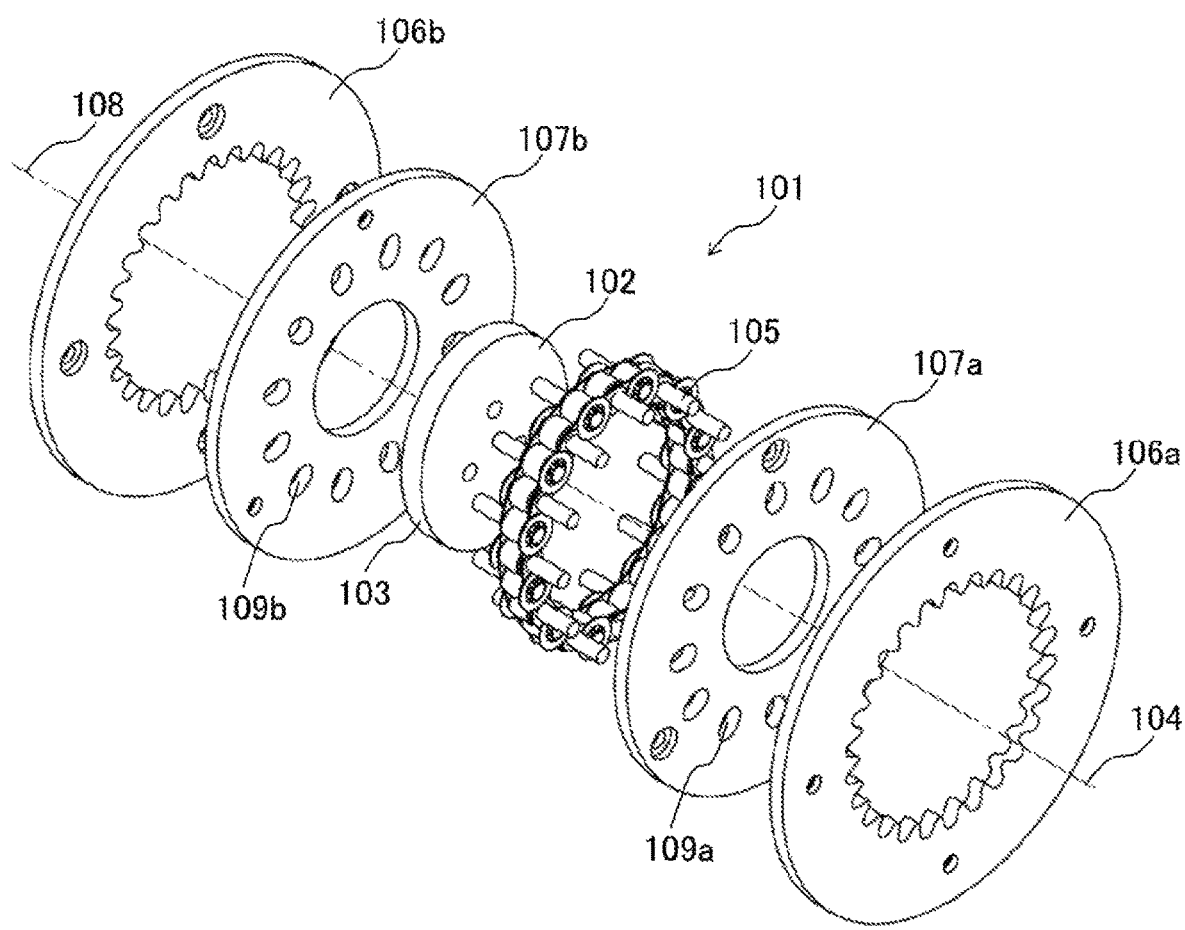
FIG. 1A is an exploded perspective view of a transmission mechanism as one embodiment of the present invention.
Figure 1B:
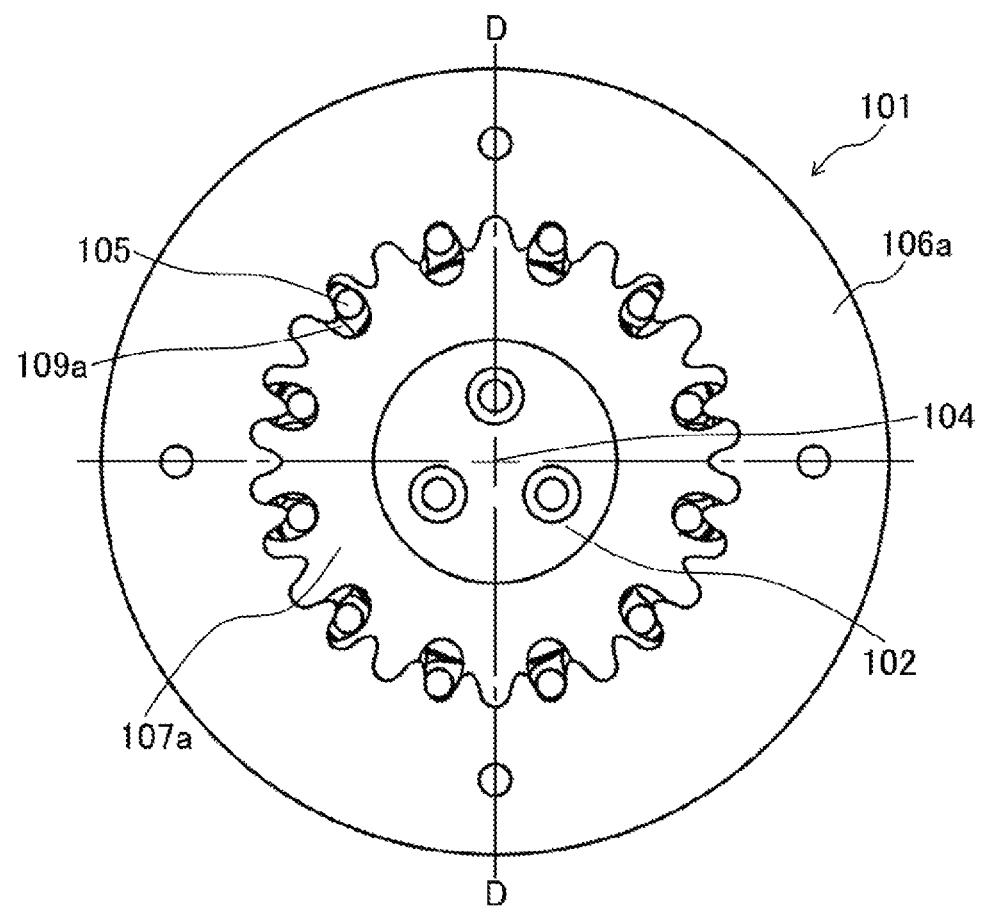
FIG. 1B is a top view of the transmission mechanism of FIG. 1A.
Figure 1C:
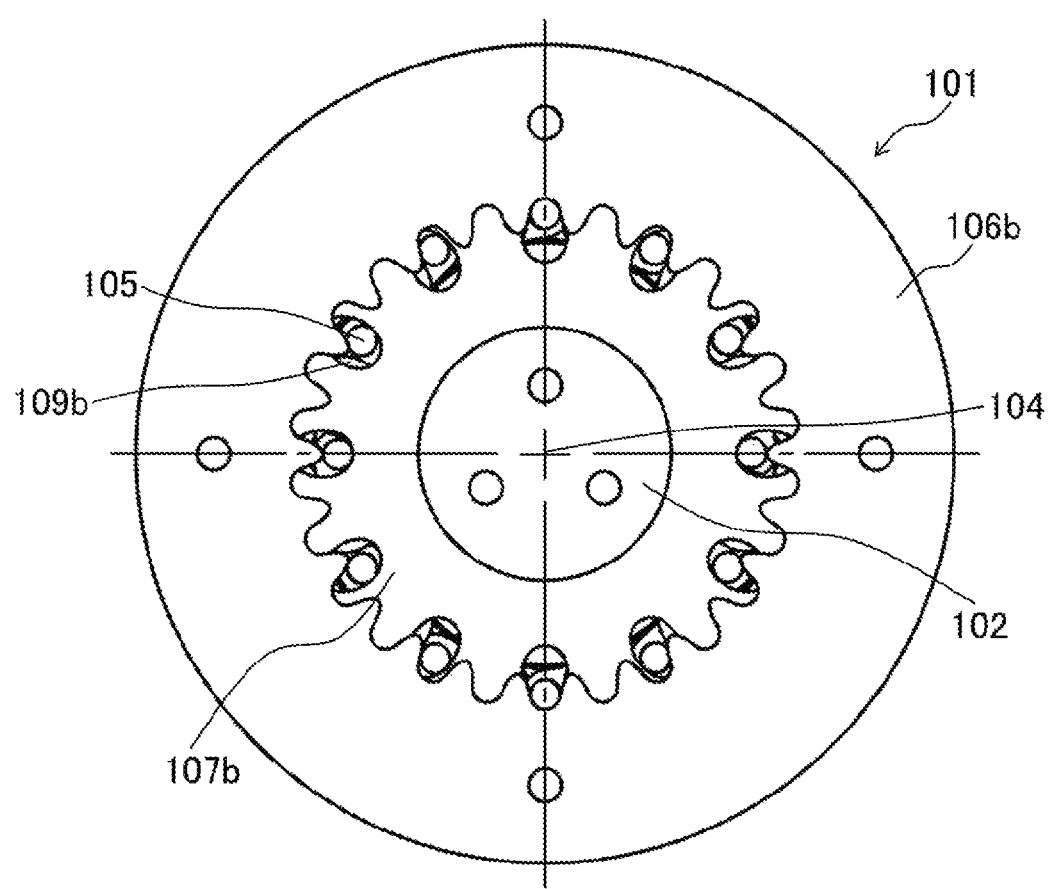
FIG. 1C is a bottom view of the transmission mechanism of FIG. 1A.
Figure 1D:
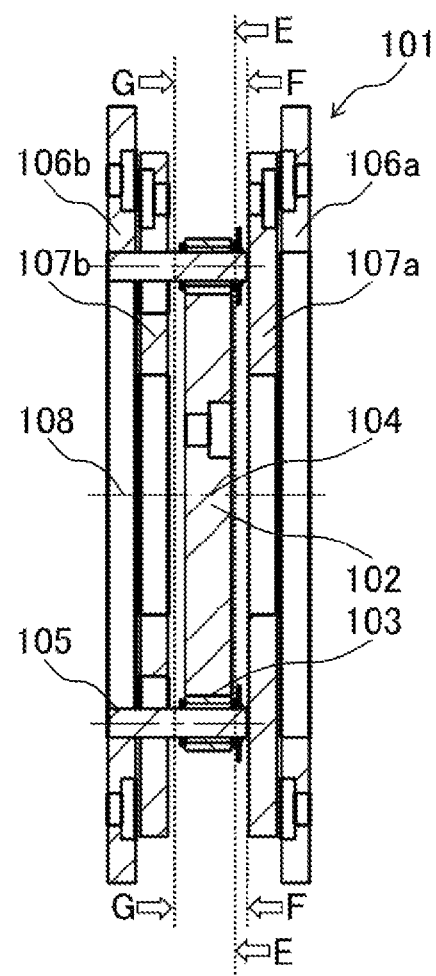
FIG. 1D is a cross-sectional view taken along the line D-D of FIG. 1B of the transmission mechanism of FIG. 1A.
Figure 1E:
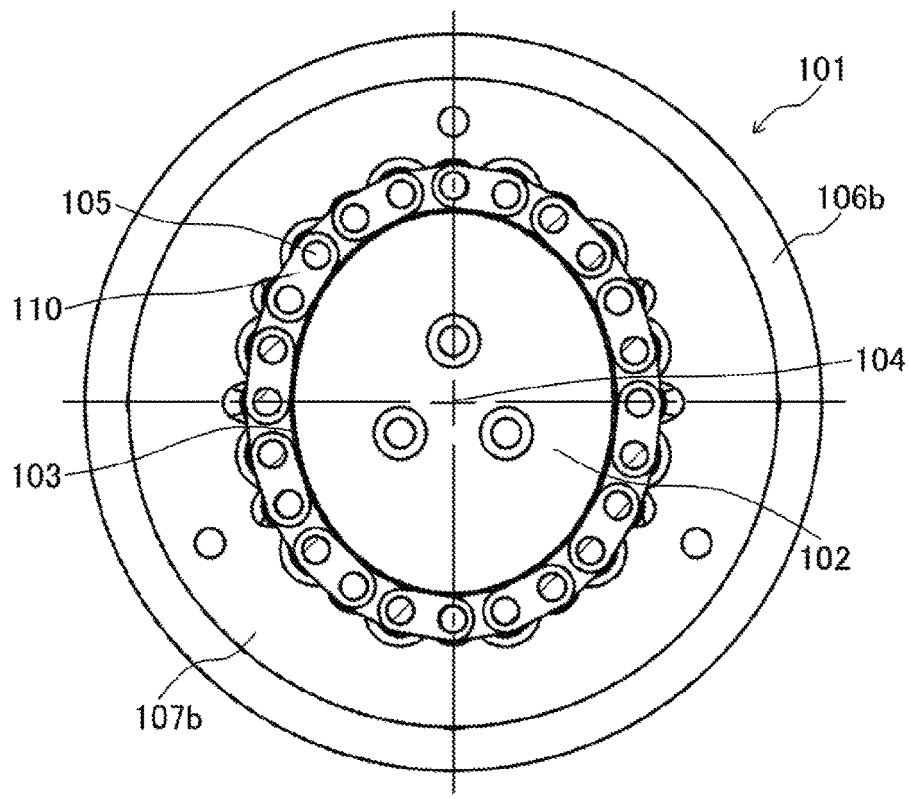
FIG. 1E is a cross-sectional view taken along the line E-E of FIG. 1D of the transmission mechanism of FIG. 1A.
Figure 1F:
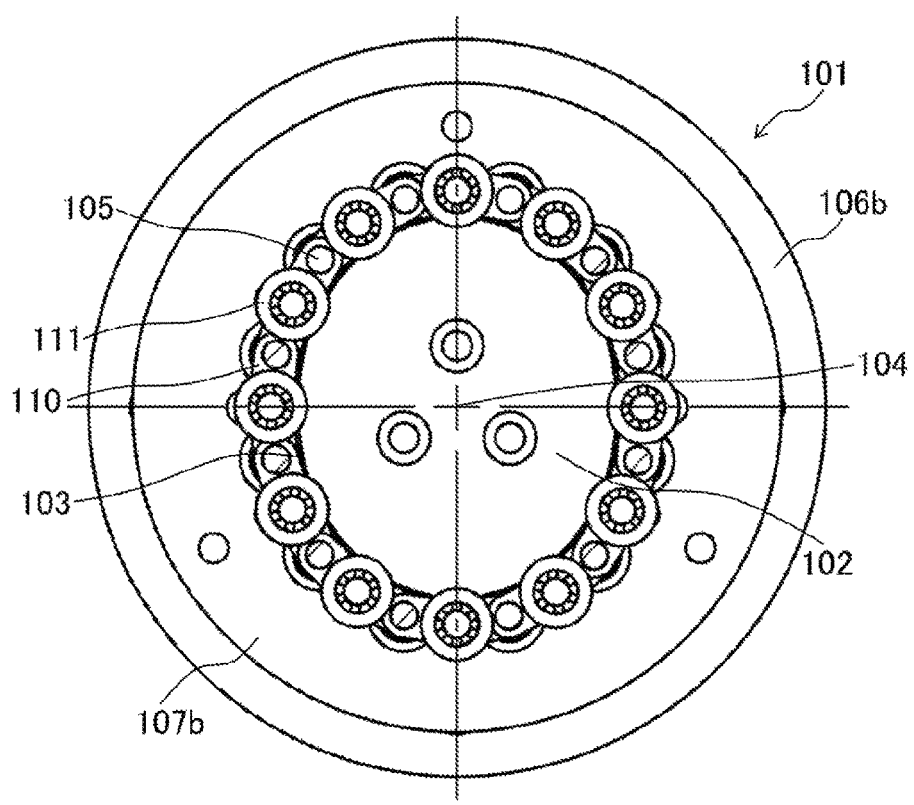
FIG. 1F is a cross-sectional view taken along the line F-F of FIG. 1D of the transmission mechanism of FIG. 1A.
Figure 1G:
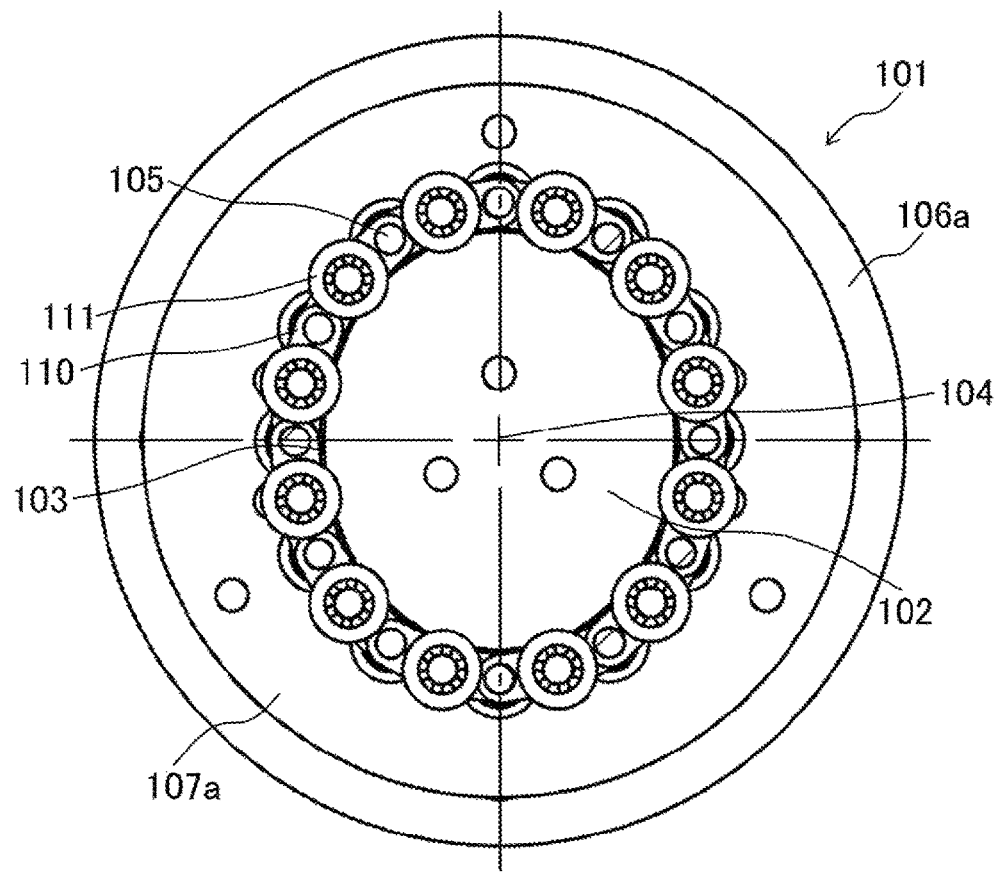
FIG. 1G is a cross-sectional view taken along the line G-G of FIG. 1D of the transmission mechanism of FIG. 1A.
Figure 1H:
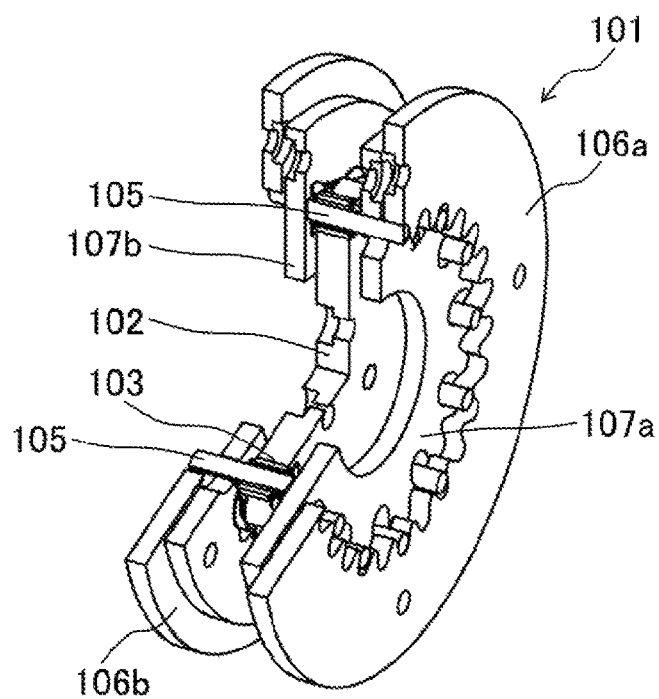
FIG. 1H is a perspective view which shows a partial cross section of the transmission mechanism of FIG. 1A.
Figure 2A:
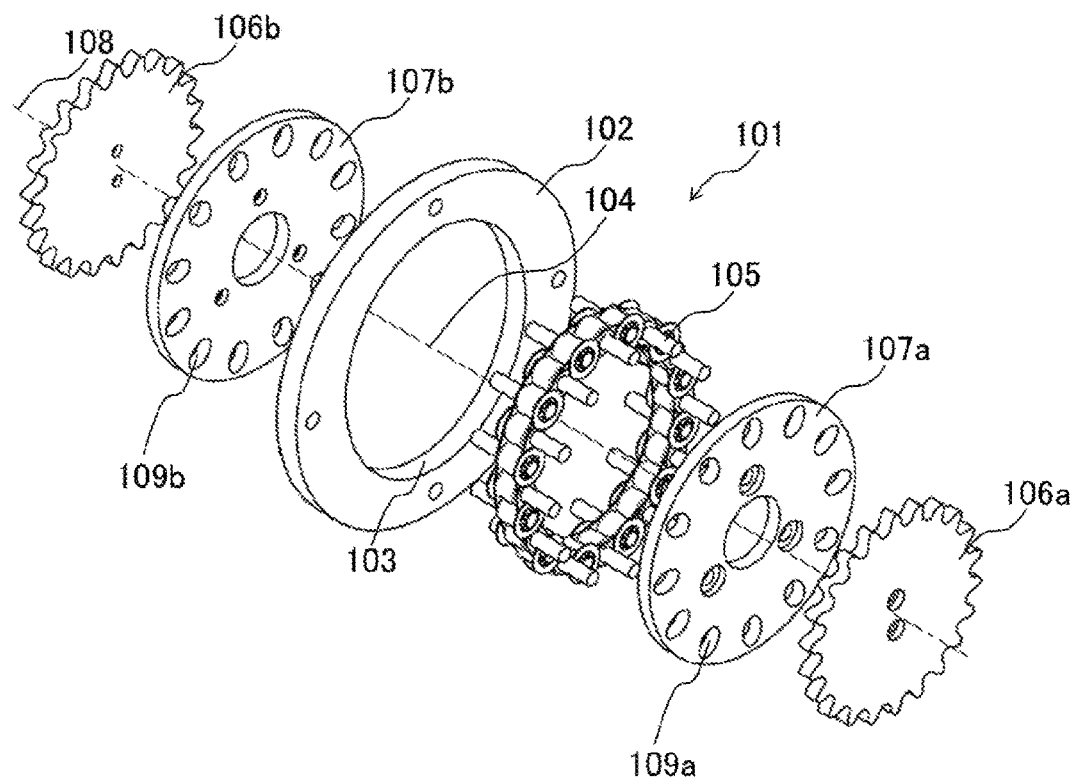
FIG. 2A is an exploded perspective view of a transmission mechanism as another embodiment of the present invention.
Figure 2B:
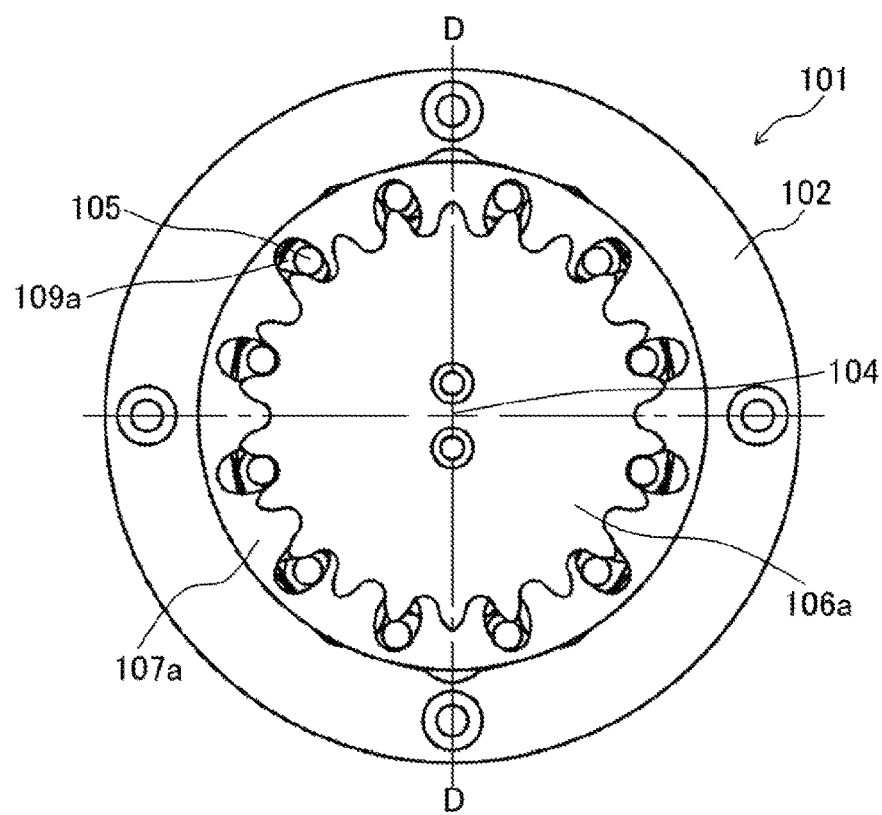
FIG. 2B is a top view of the transmission mechanism of FIG. 2A.
Figure 2C:
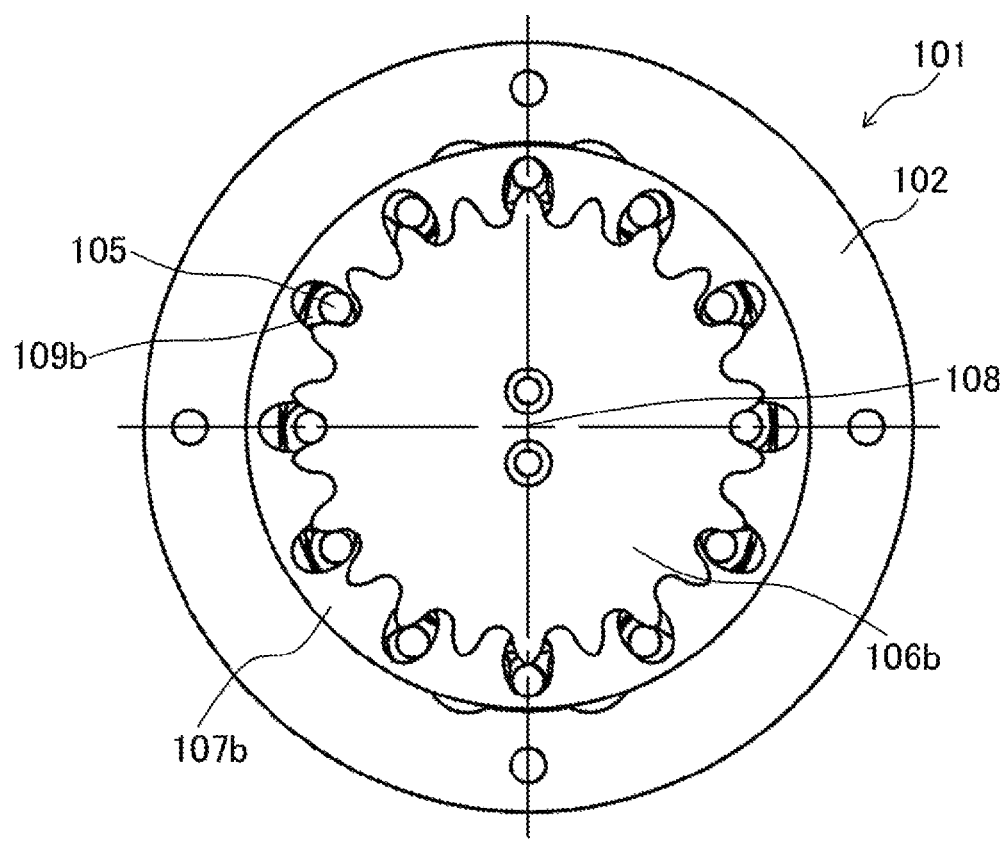
FIG. 2C is a bottom view of the transmission mechanism of FIG. 2A.
Figure 2D:
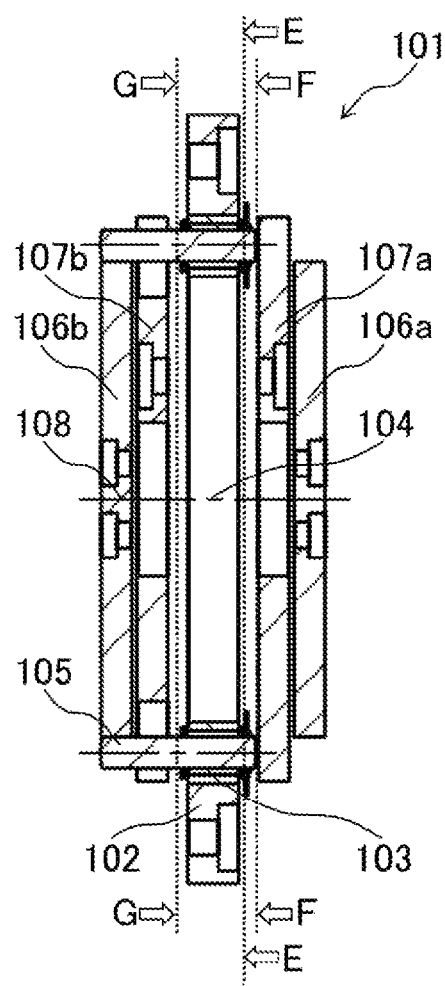
FIG. 2D is a cross-sectional view taken along the line D-D of FIG. 2B of the transmission mechanism of FIG. 2A.
Figure 2E:
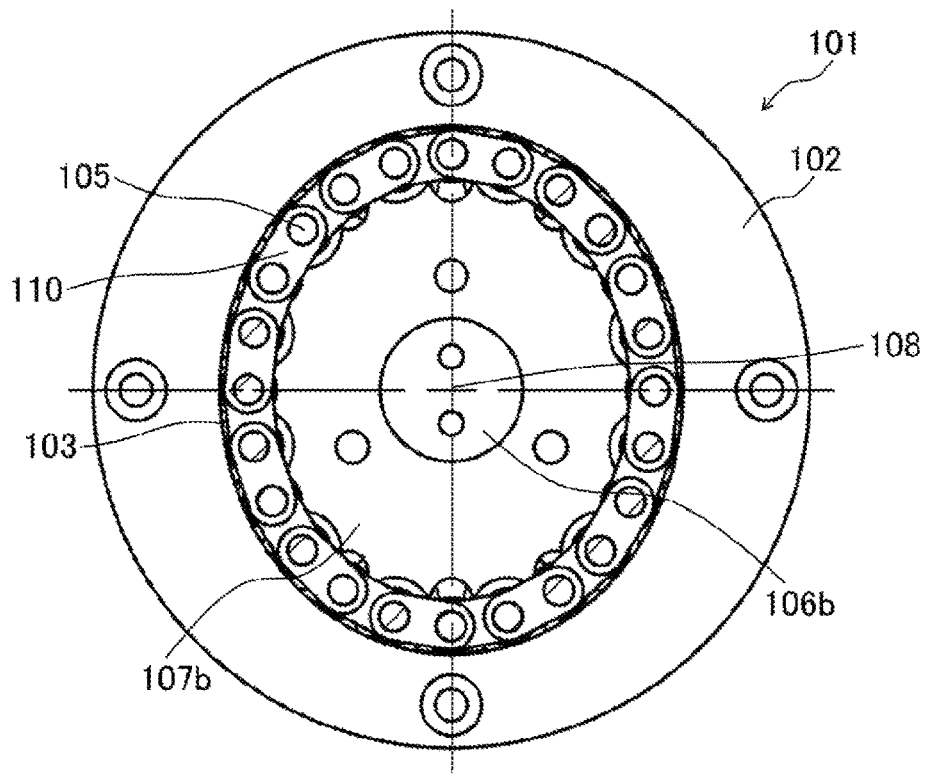
FIG. 2E is a cross-sectional view taken along the line E-E of FIG. 2D of the transmission mechanism of FIG. 2A.
Figure 2F:
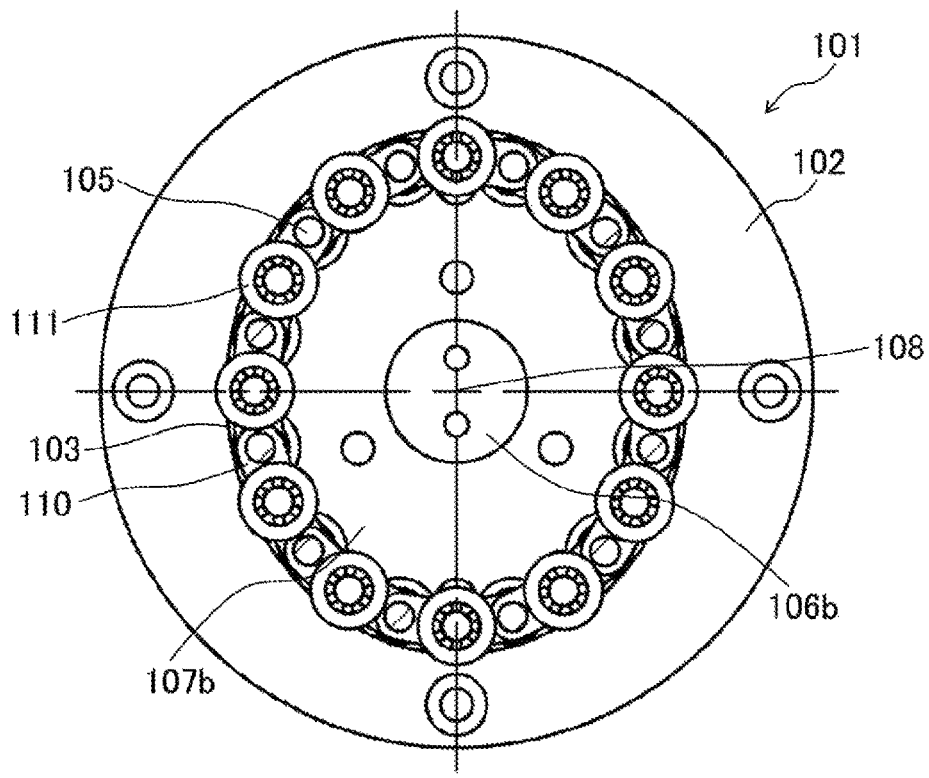
FIG. 2F is a cross-sectional view taken along the line F-F of FIG. 2D of the transmission mechanism of FIG. 2A.
Figure 2G:
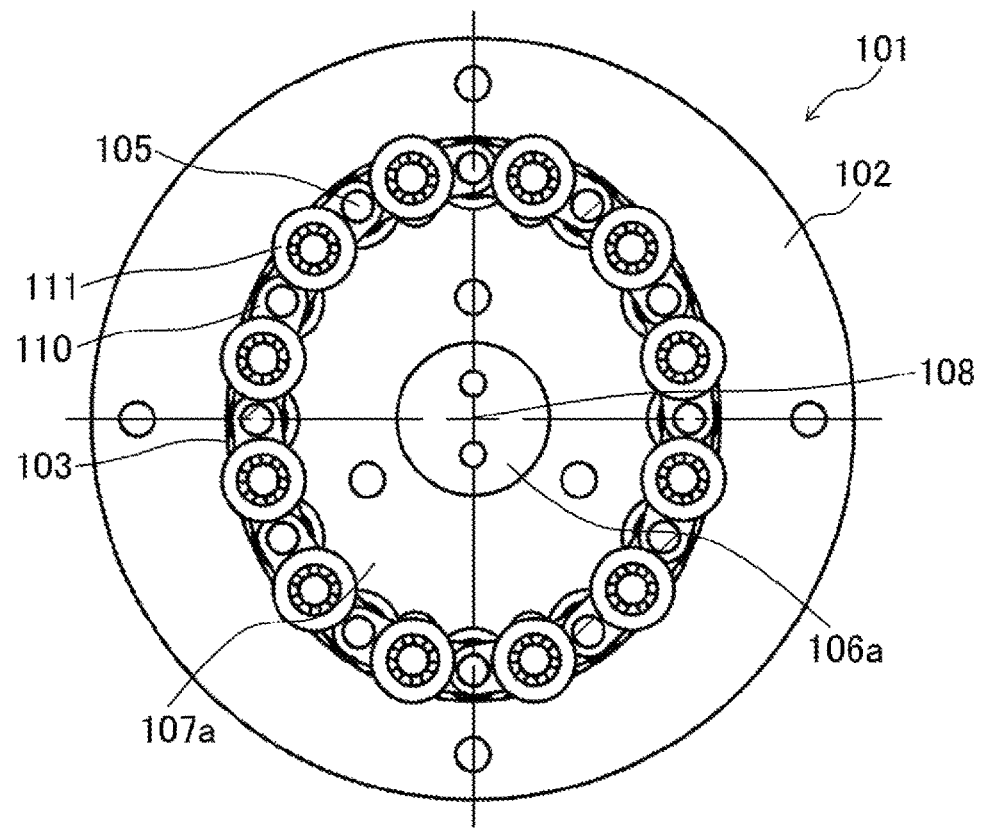
FIG. 2G is a cross-sectional view taken along the line G-G of FIG. 2D of the transmission mechanism of FIG. 2A.
Figure 2H:
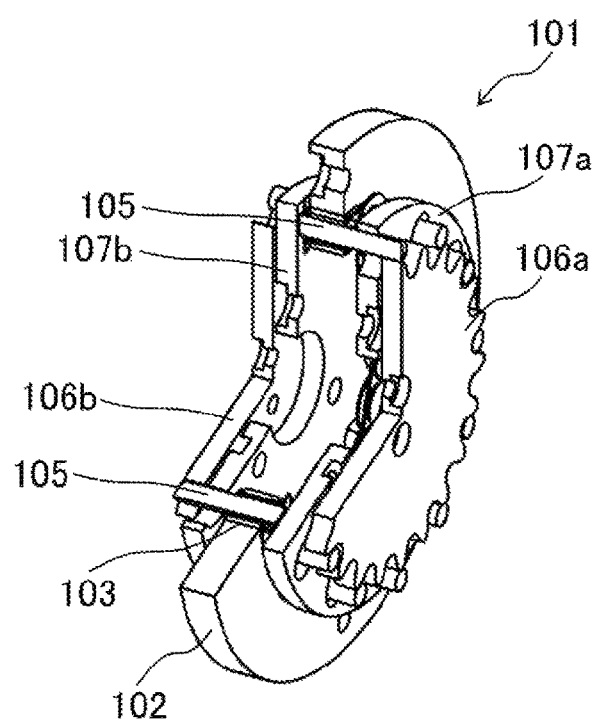
FIG. 2H is a perspective view which shows a partial cross section of the transmission mechanism of FIG. 2A.
Figure 3A:
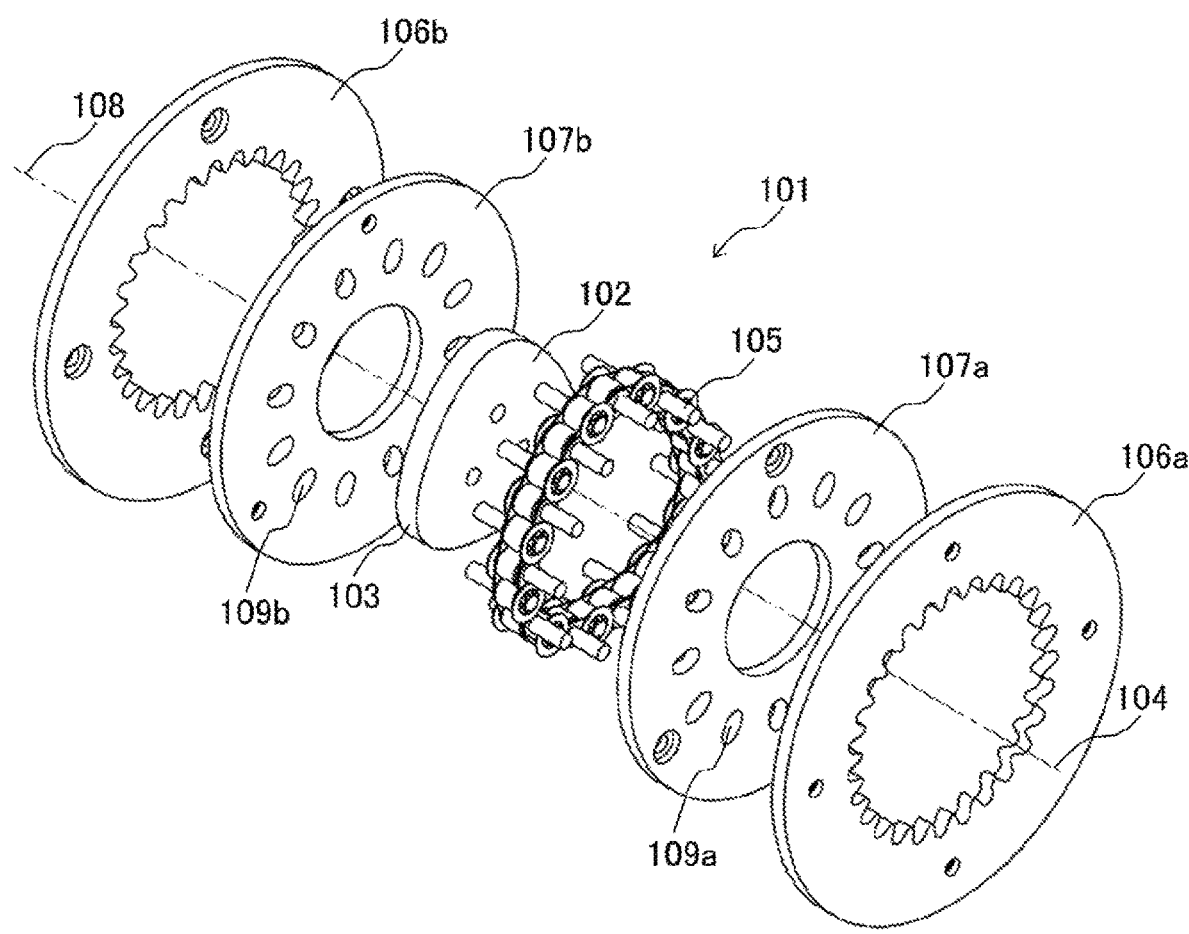
FIG. 3A is an exploded perspective view of a transmission mechanism as another embodiment of the present invention.
Figure 3B:
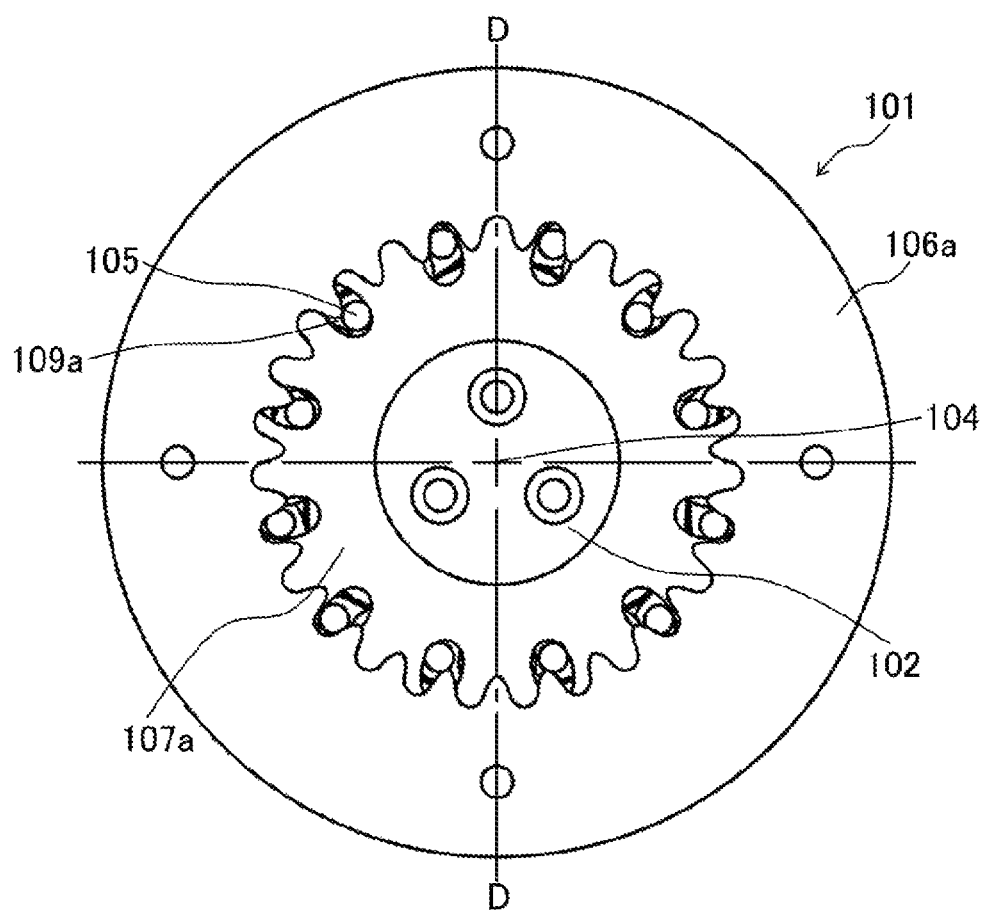
FIG. 3B is a top view of the transmission mechanism of FIG. 3A.
Figure 3C:
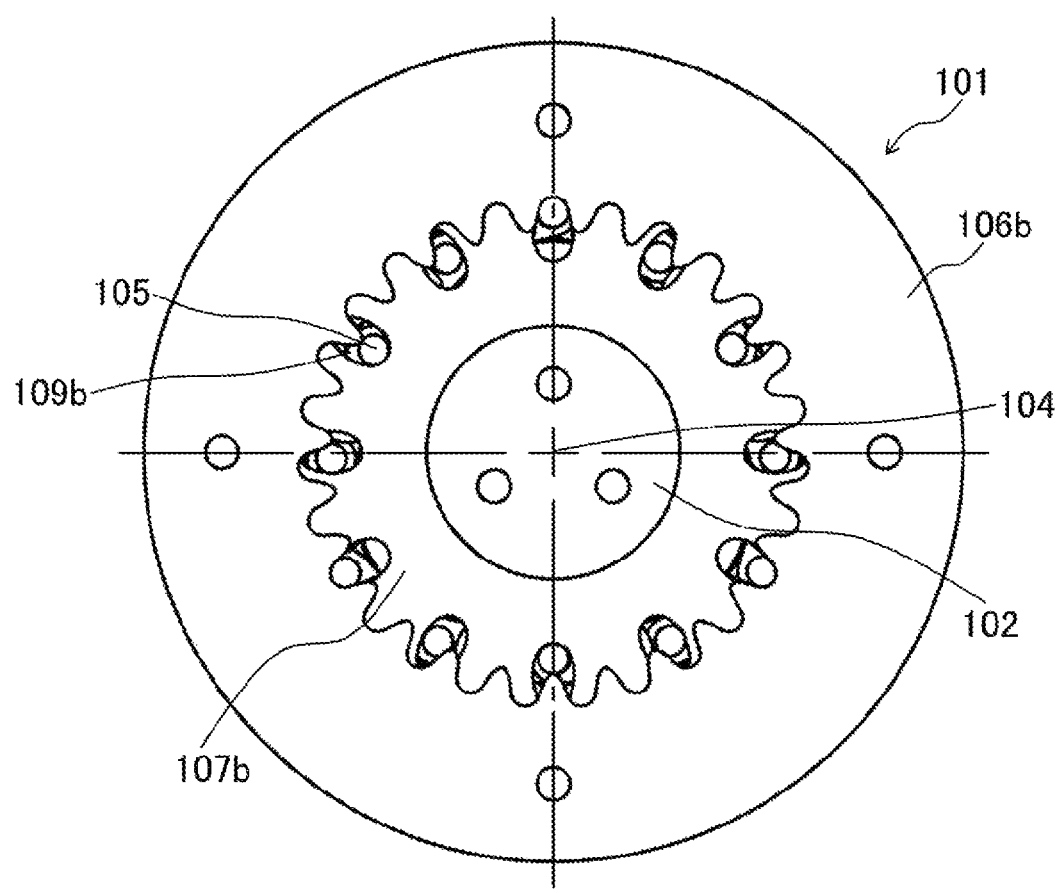
FIG. 3C is a bottom view of the transmission mechanism of FIG. 3A.
Figure 3D:
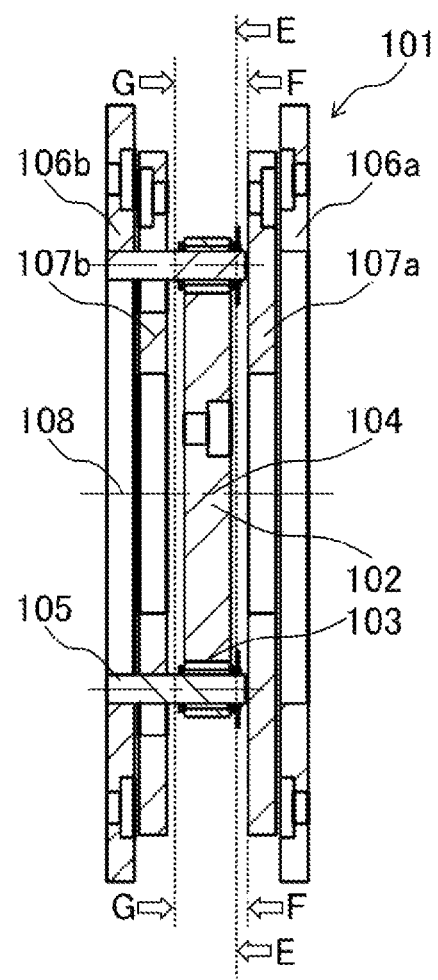
FIG. 3D is a cross-sectional view taken along the line D-D of FIG. 3B of the transmission mechanism of FIG. 3A.
Figure 3E:
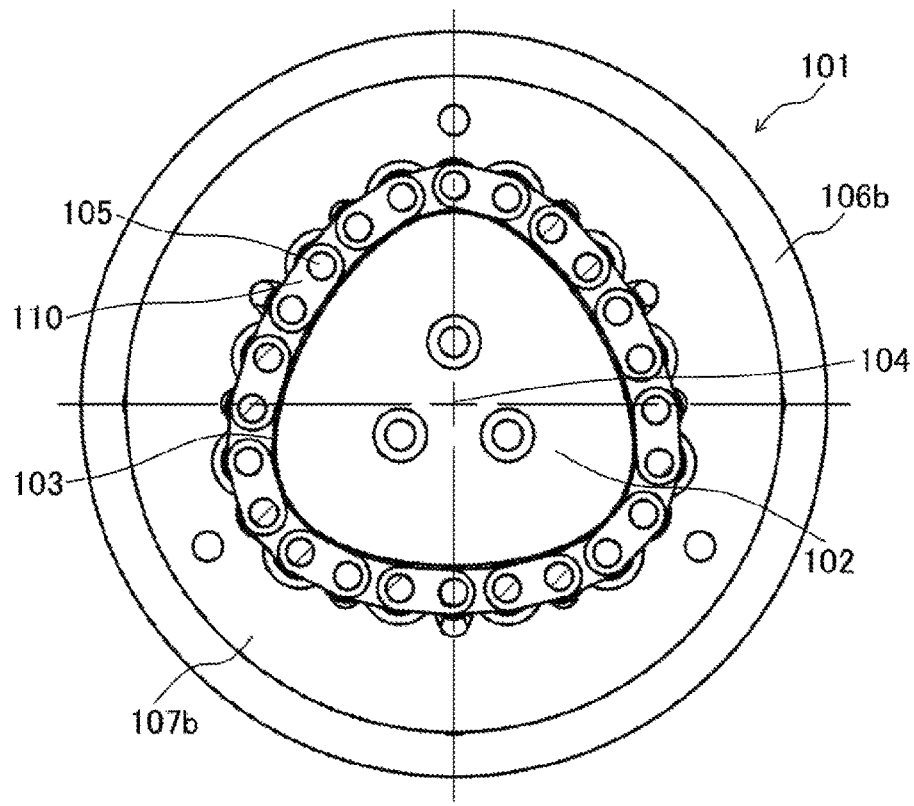
FIG. 3E is a cross-sectional view taken along the line E-E of FIG. 3D of the transmission mechanism of FIG. 3A.
Figure 3F:
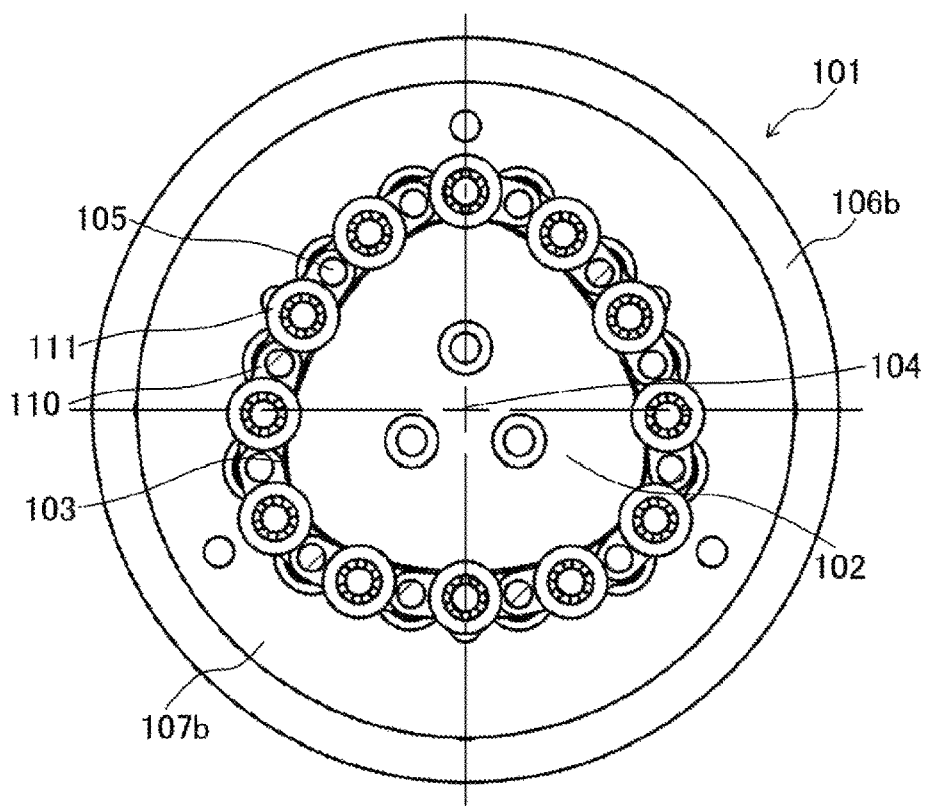
FIG. 3F is a cross-sectional view taken along the line F-F of FIG. 3D of the transmission mechanism of FIG. 3A.
Figure 3G:
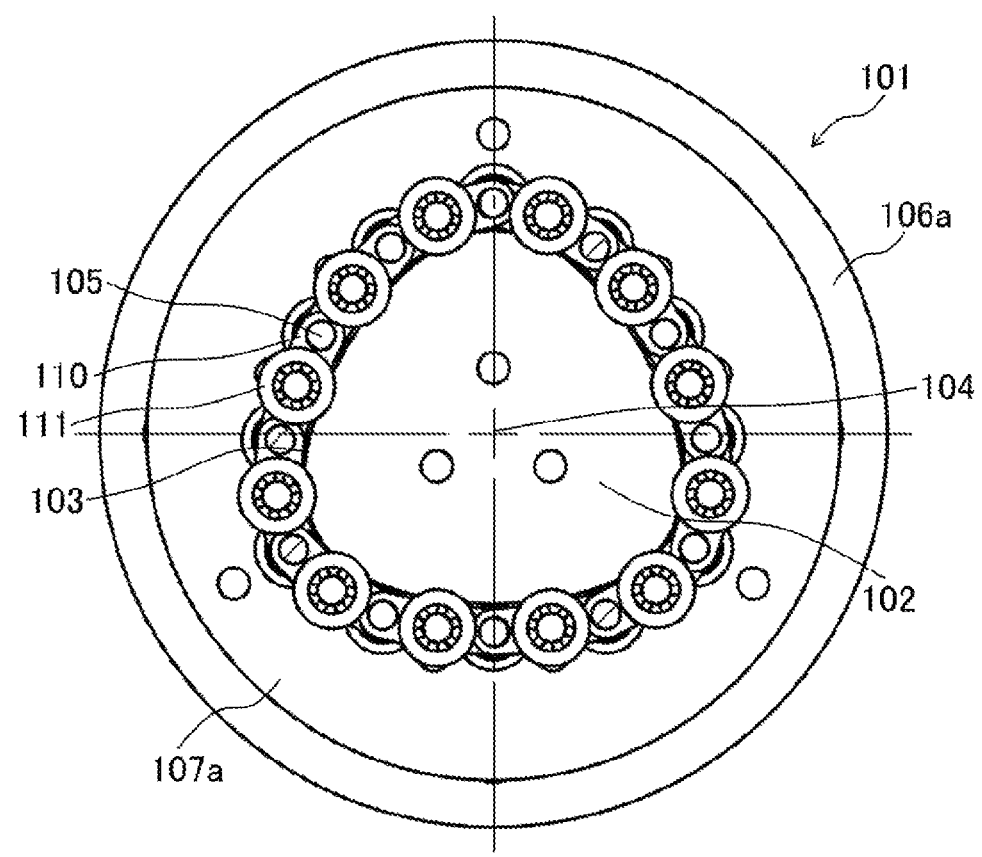
FIG. 3G is a cross-sectional view taken along the line G-G of FIG. 3D of the transmission mechanism of FIG. 3A.
Figure 4A:
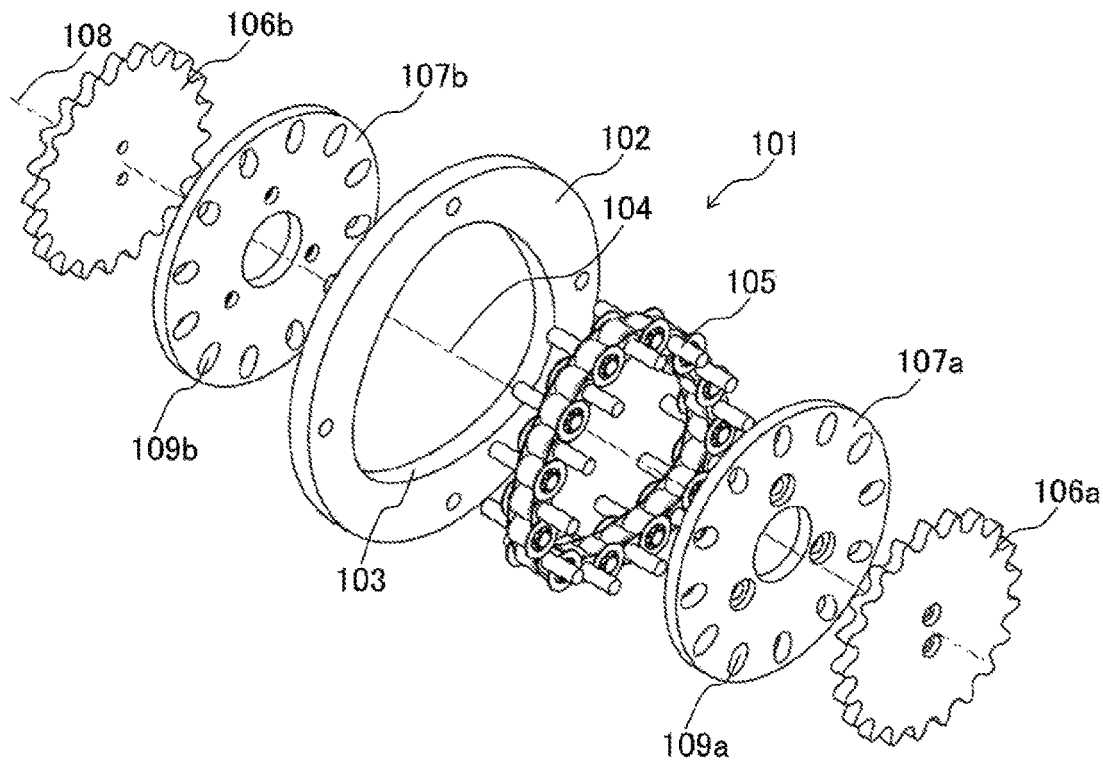
FIG. 4A is an exploded perspective view of a transmission mechanism as another embodiment of the present invention.
Figure 4B:
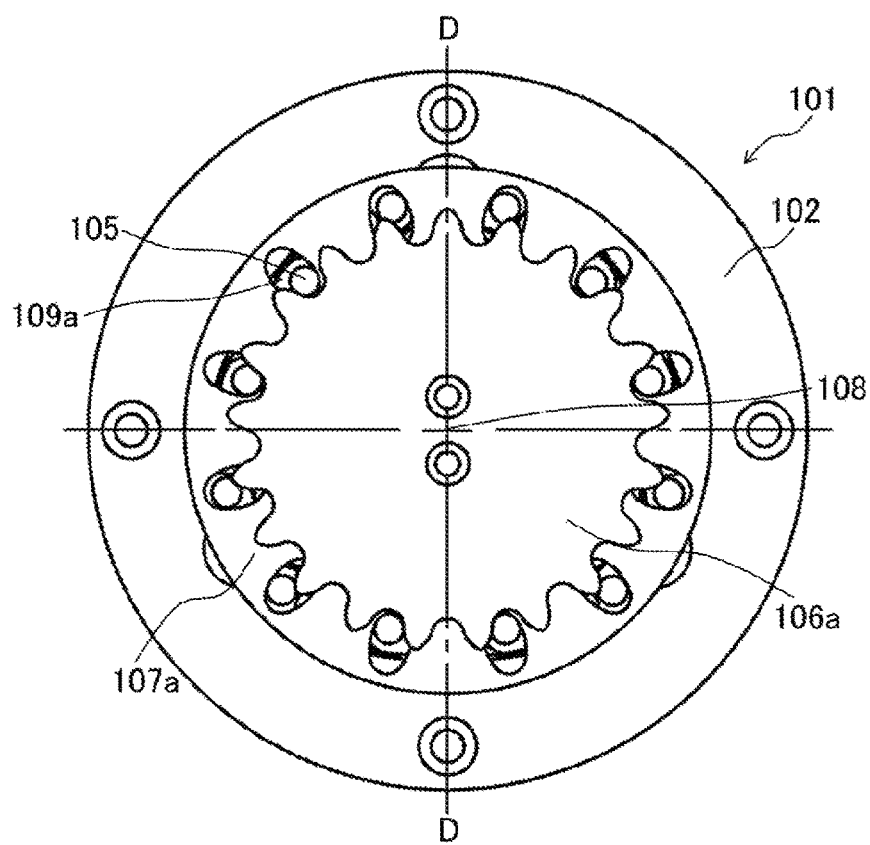
FIG. 4B is a top view of the transmission mechanism of FIG. 4A.
Figure 4C:
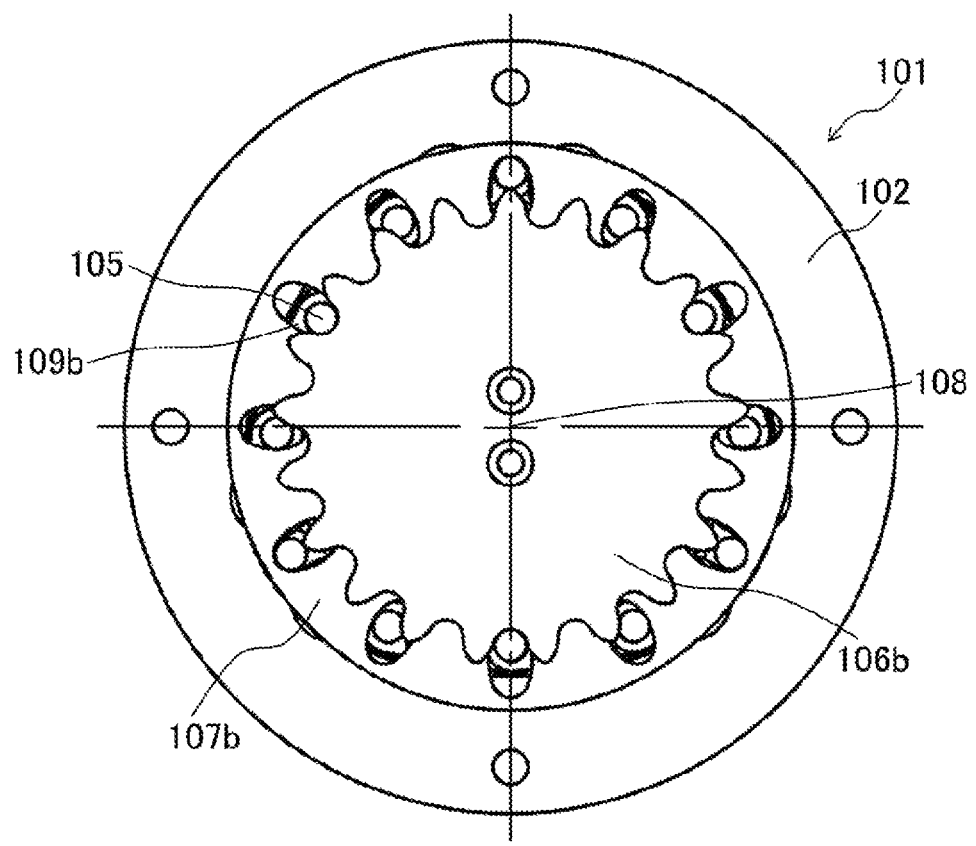
FIG. 4C is a bottom view of the transmission mechanism of FIG. 4A.
Figure 4D:
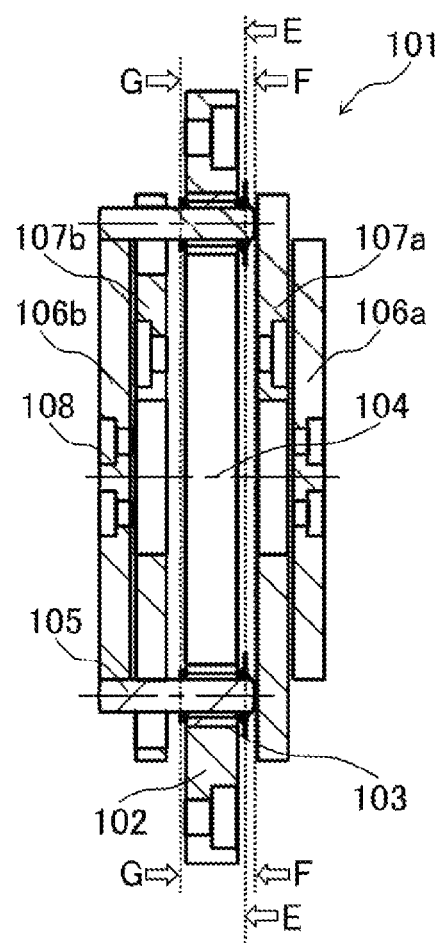
FIG. 4D is a cross-sectional view taken along the line D-D of FIG. 4B of the transmission mechanism of FIG. 4A.
Figure 4E:
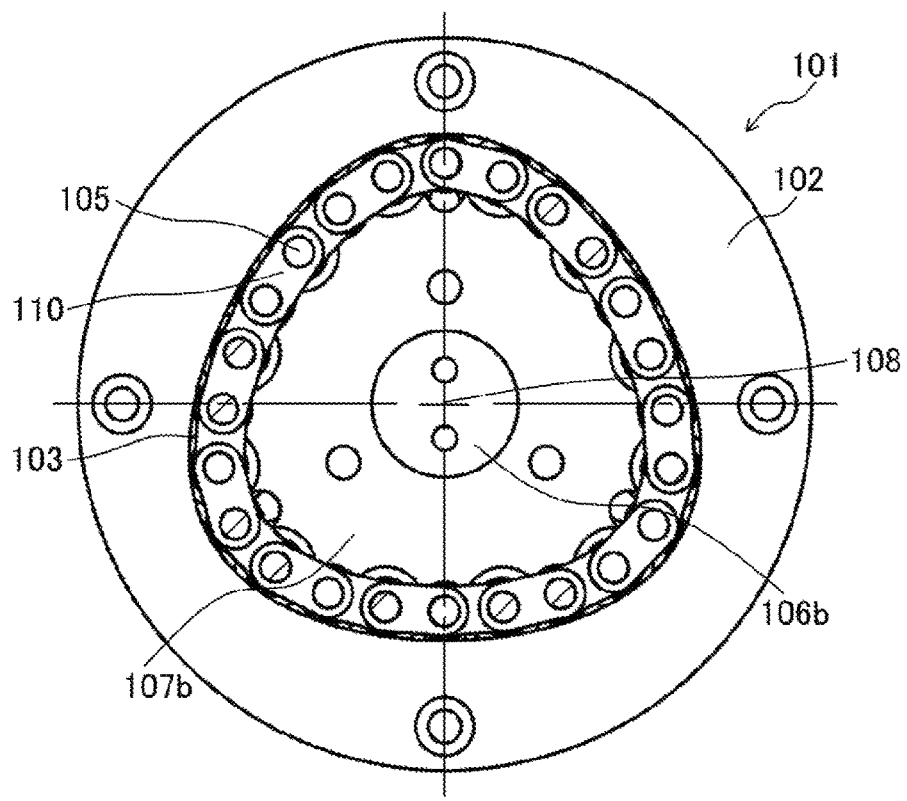
FIG. 4E is a cross-sectional view taken along the line E-E of FIG. 4D of the transmission mechanism of FIG. 4A.
Figure 4F:
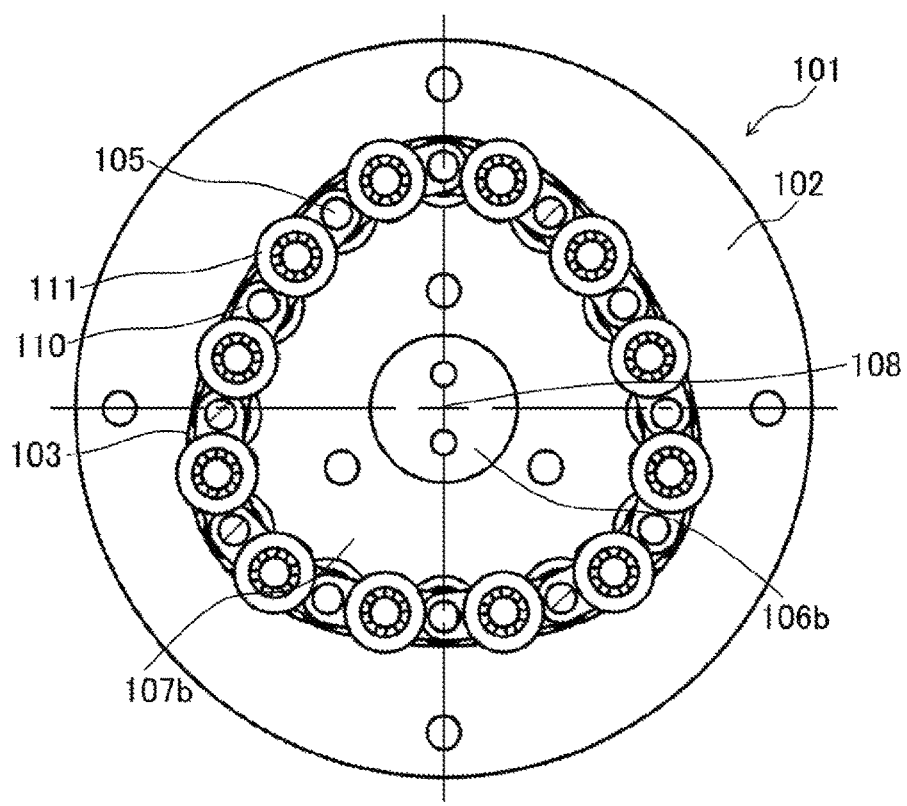
FIG. 4F is a cross-sectional view taken along the line F-F of FIG. 4D of the transmission mechanism of FIG. 4A.
Figure 4G:
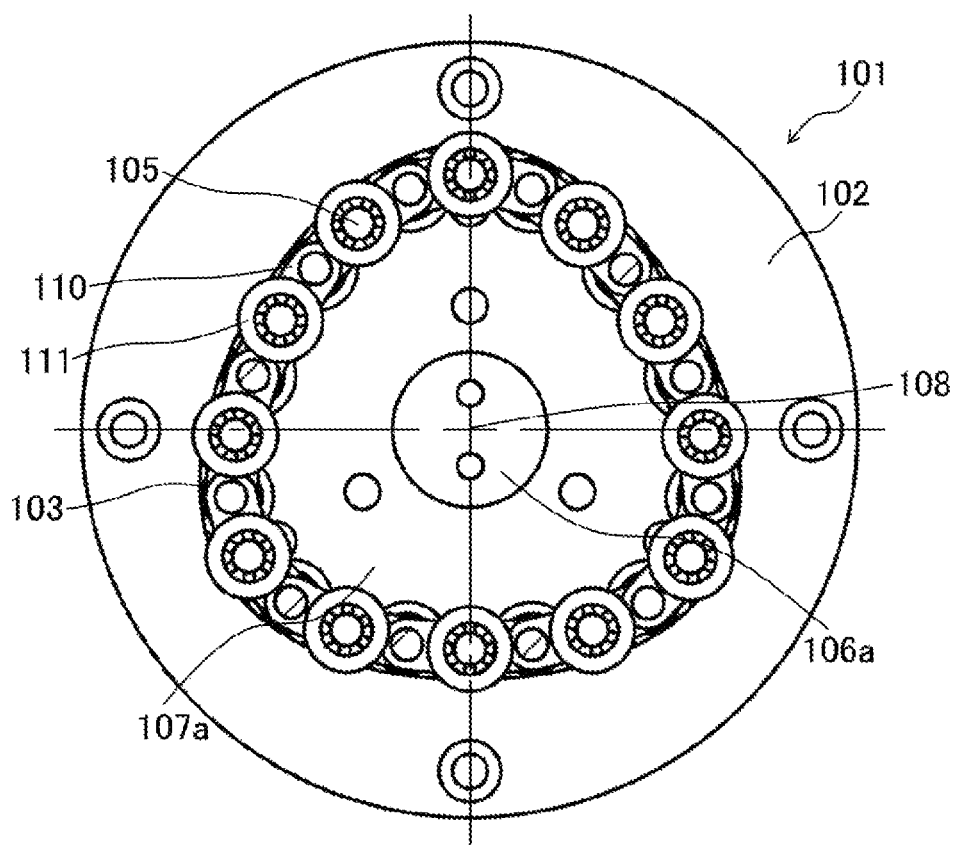
FIG. 4G is a cross-sectional view taken along the line G-G of FIG. 4D of the transmission mechanism of FIG. 4A.

Embodiments according to the present invention will be described with reference to the drawings. However, the present invention is not limited to those embodiments.

Various embodiments of a transmission mechanism 101 will be described with reference to FIGS. 1A to 5C. The transmission mechanism 101 includes a first shaft (not shown) rotatable about a first rotational axis 104, and a second shaft (not shown) rotatable about a second rotational axis 108. The first rotational axis 104 and the second rotational axis 108 may be on the same line. The first shaft may be an input shaft and the second shaft may be an output shaft. Instead, the second shaft may be an input shaft and the first shaft may be an output shaft. The first shaft includes a cam 102 concentric with the first shaft and fixed to the first shaft. The transmission mechanism 101 further includes a plurality of pins 105 arranged along the side surface 103 of the cam 102, a guide plate concentric with the second shaft, in the guide plate a plurality of guide holes being provided along a rotational direction of the second shaft, and a pair of gears concentric with the second shaft. Each pin 105 is accommodated in any of the corresponding guide holes of the plurality of guide holes provided in the guide plate. The pair of gears are configured from a first gear 106a which is concentric with the second shaft and has a plurality of teeth along the rotational direction of the second shaft, and a second gear 106b which is concentric with the second shaft and has a plurality of teeth along the rotational direction of the second shaft. The first gear 106a and the second gear 106b are arranged so as to sandwich the cam 102 between them. Moreover, the first gear 106a and the second gear 106b are arranged such that positions of the teeth of the first gear 106a and positions of the teeth of the second gear 106b are approximately aligned with each other so as to approximately match phases of the two teeth when the transmission mechanism 101 is viewed from the top surface.

The side surface 103 of the cam 102 has a positive curvature when viewed from the first rotational axis 104. That is to say, in a cross section of the side surface 103 of the cam 102 in a plane perpendicular to the first rotational axis 104, when a case where the normal vector of the side surface 103 of the cam 102 points in the direction of the first rotational axis 104 is assumed to be a positive curvature, the curvature of the side surface 103 of the cam 102 is always positive in the cross section. As shown in FIGS. 1A to 1H and 3A to 3G, when each of the pair of gears is an internal gear, the cam 102 may have the side surface 103 by a column body having a convex side surface when viewed from the first rotational axis 104. As shown in FIGS. 2A to 2H and 4A to 4G, when each of the pair of gears is an external gear, the cam 102 may have the side surface 103 by a through hole of a column body having a convex side surface when viewed from the first rotational axis 104. For example, the side surface 103 of the cam 102 may have a shape of the side surface of an elliptical cylinder, or a shape of the side surface of a substantially regular polygonal cylinder such as a substantially regular triangular cylinder, a substantially regular square cylinder, a substantially regular pentagonal cylinder, or the like, about the first rotational axis 104.

Each pin 105 comes into contact with only any one of the first gear 106a and the second gear 106b. Each pin 105 projects greatly to one side with respect to the cam 102, and can come into contact with only any one of the first gear 106a and the second gear 106b. Each pin 105 is guided by the corresponding guide hole in conjunction with rotation of one of the first shaft and the second shaft so as to move along the cam 102 and the corresponding gear, thereby causing the other of the first shaft and the second shaft to rotate relative to the one of the first shaft and the second shaft. For example, as the first shaft or the second shaft as the input shaft rotates, each pin 105 is guided to the guide hole in which the pin 105 is accommodated so as to move along the cam 102 and the first gear 106a or the second gear 106b. The motion of each pin 105 causes the second shaft or the first shaft as the output shaft to rotate relative to the first shaft or the second shaft as the input shaft. Each pin 105 comes into contact with only any one of the first gear 106a and the second gear 106b, whereby even if there are errors in positions, shapes, or the like of the teeth between the first gear 106a and the second gear 106b when the transmission mechanism 101 is viewed from the top surface, it is possible to suppress to the tilting of each pin 105 with respect to the second rotational axis 108, and it is possible to reduce the motion transmission error between the input shaft side and the output shaft side due to the shape error and the assembly error. In addition, each guide hole is formed in a shape that causes each pin 105 to move by a predetermined amount in the corresponding guide hole when the first shaft or the second shaft as the input shaft rotates. For example, each guide hole may be formed in a substantially ellipse of which the major axis points in the direction of the second rotational axis 108.

The guide plate may be arranged on one side with respect to the cam 102. Moreover, as shown in FIGS. 1A to 4G, the guide plate may be a pair of guide plates configured from a first guide plate 107a which is concentric with the second shaft, and a second guide plate 107b which is concentric with the second shaft. The first guide plate 107a and the second guide plate 107b are arranged so as to sandwich the cam 102. In addition, the first guide plate 107a and the second guide plate 107b may be arranged so as to sandwich the first gear 106a and the second gear 106b, and the first gear 106a and the second gear 106b may be arranged so as to sandwich the first guide plate 107a and the second guide plate 107b. A plurality of first guide holes 109a are provided in the first guide plate 107a along the rotational direction of the second shaft, and a plurality of second guide holes 109b are provided in the second guide plate 107b along the rotational direction of the second shaft. Each pin 105 is accommodated in the corresponding first guide hole 109a of the first guide plate 107a or the corresponding second guide hole 109b of the second guide plate 107b, and is guided by the corresponding first guide hole 109a or the corresponding second guide hole 109b so as to move along the cam 102 and the corresponding gear.

Each pin 105 may be accommodated in the corresponding guide hole of any one of the pair of guide plates that is different from a guide plate of the pair of guide plates in which the corresponding guide hole in which at least one of two adjacent pins 105 is accommodated is provided. For example, when one pin 105 is accommodated in the corresponding first guide hole 109a of the first guide plate 107a, the pin 105 adjacent to the one pin 105 is may be accommodated in the corresponding second guide hole 109b of the second guide plate 107b. By causing the one pin 105 to be accommodated in the corresponding first guide hole 109a of the first guide plate 107a and causing the two pins 105 adjacent to the one pin 105 to be accommodated in the respective corresponding second guide holes 109b of the second guide plate 107b, each pin 105 may be accommodated in the first guide hole 109a or the second guide hole 109b alternately with respect to the adjacent pins 105. In addition, although it is assumed in the following description that the guide plate is a pair of guide plates configured from the first guide plate 107a and the second guide plate 107b, the same applies when the guide plate is arranged on one side with respect to the cam 102.

Each pin 105 may come into contact with only any one of the pair of gears that is different from a gear of the pair of gears with which at least one of two adjacent pins 105 comes into contact. For example, when one pin 105 comes into contact with the first gear 106a, the pin 105 adjacent to the one pin 105 may come into contact with the second gear 106b. By causing the one pin 105 to come into contact with the first gear 106a and causing the two pins 105 adjacent to the one pin 105 to come into contact with the second gear 106b, each pin 105 may come into contact with the first gear 106a or the second gear 106b alternately with respect to the adjacent pins 105.

Figure 5A:
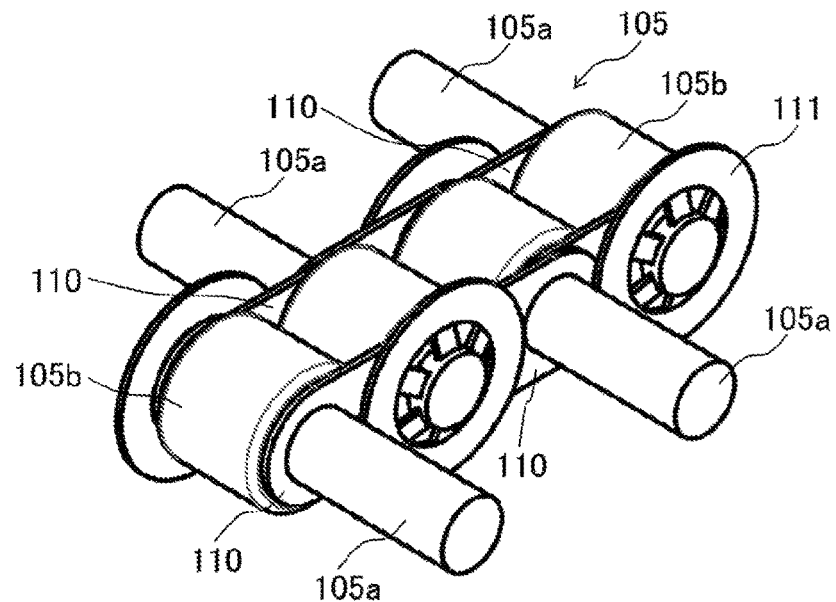
FIG. 5A is a perspective view as one embodiment of pins in the transmission mechanism of the present invention.
Figure 5B:
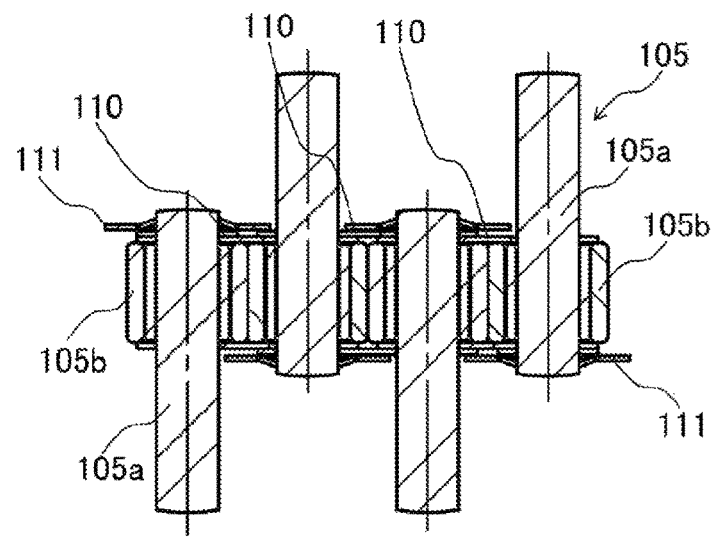
FIG. 5B is a cross-sectional view of the pins of FIG. 5A.
Figure 5C:
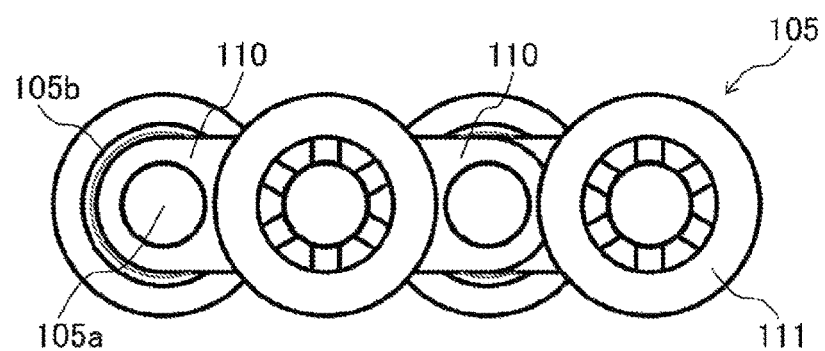
FIG. 5C is a top view of the pins of FIG. 5A.

As shown in FIGS. 5A to 5C, each pin 105 may include an inner shaft portion 105a and an outer ring portion 105b that rotates around the inner shaft portion 105a. The outer ring portion 105b may be in sliding contact and rotate around the inner shaft portion 105a, or may be in rolling contact via a roller or the like and rotate around the inner shaft portion 105a. Each pin 105 is arranged such that the outer ring portion 105b comes into contact with the side surface 103 of the cam 102 and the outer ring portion 105b of the adjacent pin 105. Only a portion of the inner shaft portion 105a protruding from the outer ring portion 105b of each pin 105 comes into contact with the first gear 106a or the second gear 106b. When the guide plate is arranged on one side with respect to the cam 102, one end of the inner shaft portion 105a of each pin 105 is accommodated in the corresponding guide hole of the guide plate. When the guide plate is a pair of guide plates configured from the first guide plate 107a and the second guide plate 107b, only a portion of the inner shaft portion 105a protruding from the outer ring portion 105b of each pin 105 is accommodated in the corresponding first guide hole 109a of the first guide plate 107a or the corresponding second guide hole 109b of the second guide plate 107b.

Each pin 105 may be coupled with at least one of two adjacent pins 105 by a chain 110. When each pin 105 comes into contact with only any one of the pair of gears that is different from a gear of the pair of gears with which at least one of two adjacent pins 105 comes into contact, for example, when one pin 105 comes into contact with the first gear 106a while the pin 105 adjacent to the one pin 105 comes into contact with the second gear 106b, each pin 105 and its adjacent pin 105 are coupled by the chain 110 so as to be rotatable relative to each other, whereby it is possible to move the two adjacent pins 105 in conjunction with each other along the cam 102 and the respective corresponding gears. The two adjacent pins 105 may be coupled so as to sandwich each outer ring portion 105b by two chains 110. Moreover, a pin stopper 111 may be arranged on one end of the inner shaft portion 105a of each pin 105, thereby causing the chain 110 and the outer ring portion 105b not to move in the axial direction of the inner shaft portion 105a.

One of the pair of guide plates configured from the first guide plate 107a and the second guide plate 107b and the pair of gears configured from the first gear 106a and the second gear 106b are fixed to the second shaft, and the other of them are fixed to a housing (not shown) of the transmission mechanism 101. That is to say, either the first guide plate 107a and the second guide plate 107b or the first gear 106a and the second gear 106b rotate together with the second shaft.

As shown in FIGS. 1A to 1H and FIGS. 3A to 3G, the first gear 106a and the second gear 106b configuring the pair of gears may be internal gears. In this case, the cam 102 may have a shape having the side surface 103 of an elliptical column (refer to FIG. 1A), or the side surface 103 of a substantially regular polygonal column such as a substantially regular triangular column (refer to FIG. 3A), a substantially regular square column, a substantially regular pentagonal column, or the like, about the first rotational axis 104, and the plurality of pins 105 are arranged outside along the side surface 103 of the cam 102. For example, when the pair of guide plates configured from the first guide plate 107a and the second guide plate 107b are fixed to the housing of the transmission mechanism 101, as the cam 102 rotates in conjunction with rotation of the first shaft as the input shaft, each pin 105 is guided by the guide hole in which the pin 105 is accommodated so as to move in contact with the cam 102 and the corresponding gear of the first gear 106a and the second gear 106b, between the cam 102 and the corresponding gear, such that the corresponding gear rotates in the direction opposite to the rotational direction of the cam 102. Moreover, when the pair of gears are fixed to the housing of the transmission mechanism 101, as the cam 102 rotates in conjunction with rotation of the first shaft as the input shaft, each pin 105 is guided by the guide hole in which the pin 105 is accommodated so as to move in contact with the cam 102 and the corresponding gear of the first gear 106a and the second gear 106b, between the cam 102 and the corresponding gear, such that the corresponding guide plate rotates in the direction opposite to the rotational direction of the cam 102. The same applies when the second shaft as the input shaft rotates.

When the first gear 106a and the second gear 106b configuring the pair of gears may be internal gears, the curvature of the side surface 103 of the cam 102 obtained by circling along the rotational direction of the first shaft from 0 to 360° has two local maximal values or more. The two local maximal values or more of the curvature are obtained at equal intervals from 0 to 360°. For example, when the cam 102 has a shape having the side surface 103 of an elliptical column, there is a local maximal value of the curvature at each of two vertices of the major axis of ellipse at 180° intervals in the cross section of the cam 102 in a plane perpendicular to the first rotational axis 104, and when the cam 102 has a shape having the side surface 103 of a substantially regular triangular column, there is a local maximal value of the curvature at each of three vertices of a substantially regular triangle at 120° intervals in the cross section of the cam 102 in a plane perpendicular to the first rotational axis 104. As one of the first shaft and the second shaft rotates, the teeth of the first gear 106a or the second gear 106b with which each pin 105 engages are altered, according to the relationship between the side surface 103 of the cam 102 having such local maximal values and the first gear 106a and the second gear 106b which are internal gears, whereby the rotation of the one is transmitted to the other of the first shaft and the second shaft so as to rotate the other. As the number of teeth of each of the first gear 106a and the second gear 106b is made $N_T$, the number of the plurality of pins 105 is made $N_P$, and the number of the local maximal values of the curvature is made $N_M$, there is the relationship that $N_T = N_P + N_M$. When the first shaft is made the input shaft, as the pair of guide plates are fixed to the housing of the transmission mechanism 101, the gear ratio is $N_M/N_T$, and as the pair of gears are fixed to the housing of the transmission mechanism 101, the gear ratio is $N_M/N_P$. Moreover, when the second shaft is made the input shaft, as the pair of guide plates are fixed to the housing of the transmission mechanism 101, the gear ratio is $N_T/N_M$, and as the pair of gears are fixed to the housing of the transmission mechanism 101, the gear ratio is $N_P/N_M$.

As shown in FIGS. 2A to 2H and FIGS. 4A to 4G, the first gear 106a and the second gear 106b configuring the pair of gears may be external gears. In this case, a through hole having the side surface 103 of an elliptical column (refer to FIG. 2A), or the side surface 103 of a substantially regular polygonal column such as a substantially regular triangular column (refer to FIG. 4A), a substantially regular square column, a substantially regular pentagonal column, or the like, about the first rotational axis 104 may be provided in the cam 102, and the plurality of pins 105 are arranged inside along the side surface 103 of the cam 102. For example, when the pair of guide plates configured from the first guide plate 107a and the second guide plate 107b are fixed to the housing of the transmission mechanism 101, as the cam 102 rotates in conjunction with rotation of the first shaft as the input shaft, each pin 105 is guided by the guide hole in which the pin 105 is accommodated so as to move in contact with the cam 102 and the corresponding gear of the first gear 106a and the second gear 106b, between the cam 102 and the corresponding gear, such that the corresponding gear rotates in the direction opposite to the rotational direction of the cam 102. Moreover, when the pair of gears are fixed to the housing of the transmission mechanism 101, as the cam 102 rotates in conjunction with rotation of the first shaft as the input shaft, each pin 105 is guided by the guide hole in which the pin 105 is accommodated so as to move in contact with the cam 102 and the corresponding gear of the first gear 106a and the second gear 106b, between the cam 102 and the corresponding gear, such that the corresponding guide plate rotates in the direction opposite to the rotational direction of the cam 102. The same applies when the second shaft as the input shaft rotates.

When the first gear 106a and the second gear 106b configuring the pair of gears may be external gears, the curvature of the side surface 103 of a through hole provided in the cam 102 obtained by circling along the rotational direction of the first shaft from 0 to 360° has two local maximal values or more. The two local maximal values or more of the curvature are obtained at equal intervals from 0 to 360°. For example, when the side surface 103 of a through hole of an elliptical column is provided in the cam 102, there is a local maximal value of the curvature at each of two vertices of the major axis of ellipse at 180° intervals in the cross section of the cam 102 in a plane perpendicular to the first rotational axis 104, and when the side surface 103 of a through hole of a substantially regular triangular column is provided in the cam 102, there is a local maximal value of the curvature at each of three vertices of a substantially regular triangle at 120° intervals in the cross section of the cam 102 in a plane perpendicular to the first rotational axis 104. As one of the first shaft and the second shaft rotates, the teeth of the first gear 106a or the second gear 106b with which each pin 105 engages are altered, according to the relationship between the side surface 103 of the cam 102 having such local maximal values and the first gear 106a and the second gear 106b which are external gears, whereby the rotation of the one is transmitted to the other of the first shaft and the second shaft so as to rotate the other. As the number of the plurality of pins 105 is made $N_P$, the number of teeth of each of the first gear 106a and the second gear 106b is made $N_T$, and the number of the local maximal values of the curvature is made $N_M$, there is the relationship that $N_P=N_T/N_M$. When the first shaft is made the input shaft, as the pair of guide plates are fixed to the housing of the transmission mechanism 101, the gear ratio is $N_M/N_T$, and as the pair of gears are fixed to the housing of the transmission mechanism 101, the gear ratio is $N_M/N_P$. Moreover, when the second shaft is made the input shaft, as the pair of guide plates are fixed to the housing of the transmission mechanism 101, the gear ratio is $N_T/N_M$, and as the pair of gears are fixed to the housing of the transmission mechanism 101, the gear ratio is $N_P/N_M$.

It should be further understood by persons skilled in the art that although the foregoing description has been made on embodiments of the present invention, the present invention is not limited thereto and various changes and modifications may be made without departing from the principle of the present invention and the scope of the appended claims.

The invention claimed is:

1. A transmission mechanism comprising:
a first shaft rotatable about a first rotational axis, the first shaft comprising a cam concentric with the first shaft and fixed to the first shaft, the side surface of the cam having a positive curvature when viewed from the first rotational axis;
a plurality of pins arranged along the side surface of the cam;
a second shaft rotatable about a second rotational axis;
a guide plate concentric with the second shaft, a plurality of guide holes being provided in the guide plate along a rotational direction of the second shaft, each pin being accommodated in a corresponding guide hole; and
a pair of gears concentric with the second shaft, the pair of gears being arranged so as to sandwich the cam; wherein
each pin comes into contact with only any one of the pair of gears; and
in conjunction with rotation of one of the first shaft and the second shaft, each pin is guided by the corresponding guide hole so as to move along the cam and a corresponding gear, thereby causing the other of the first shaft and the second shaft to rotate relative to the one of the first shaft and the second shaft.

2. The transmission mechanism according to claim 1, wherein each pin comes into contact with only any one of the pair of gears that is different from a gear of the pair of gears with which at least one of two adjacent pins comes into contact.

3. The transmission mechanism according to claim 1, wherein each pin is coupled with at least one of two adjacent pins by a chain.

4. The transmission mechanism according to claim 1, wherein the guide plate is a pair of guide plates arranged so as to sandwich the cam, and each pin is accommodated in a corresponding guide hole of any one of the pair of guide plates.

5. The transmission mechanism according to claim 4, wherein each pin is accommodated in a corresponding guide hole of any one of the pair of guide plates that is different from a guide plate of the pair of guide plates in which a corresponding guide hole in which at least one of two adjacent pins is accommodated is provided.

6. The transmission mechanism according to claim 1, wherein either the guide plate or the pair of gears is/are fixed to the second shaft.

7. The transmission mechanism according to claim 1, wherein each of the pair of gears is an internal gear, and the plurality of pins are arranged outside the cam.

8. The transmission mechanism according to claim 7, wherein the curvature of the side surface of the cam obtained by circling along a rotational direction of the first shaft has two local maximal values or more, and the number of teeth of each of the pair of gears is the sum of the number of the plurality of pins and the number of the local maximal values.

9. The transmission mechanism according to claim 1, wherein each of the pair of gears is an external gear, and the plurality of pins are arranged inside the cam.

10. The transmission mechanism according to claim 9, wherein the curvature of the side surface of the cam obtained by circling along a rotational direction of the first shaft has two local maximal values or more, and the number of the plurality of pins is the sum of the number of teeth of each of the pair of gears and the number of the local maximal values.

* * * * *